B. E. HALE.
CORN AND CALLOUS REMOVER.
APPLICATION FILED JAN. 15, 1916.
1,203,869.
Patented Nov. 7, 1916.
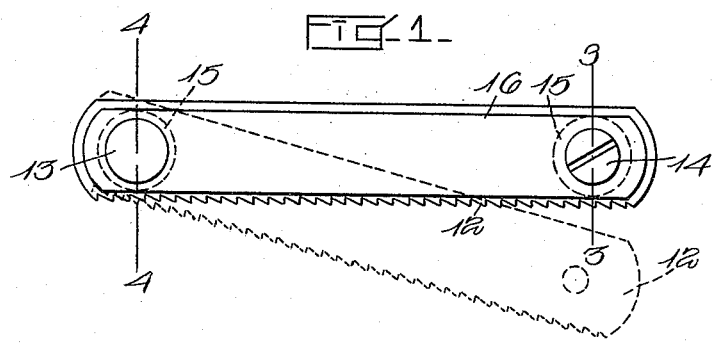
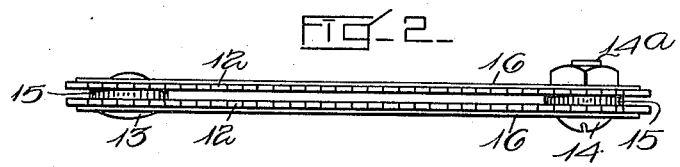
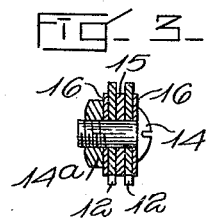 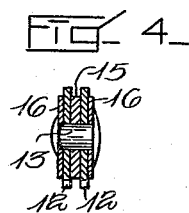
INVENTOR:
BARRY E HALE
by
ATTORNEYS

UNITED STATES PATENT OFFICE.

BARRY E. HALE, OF GREENFIELD, MASSACHUSETTS.

CORN AND CALLOUS REMOVER.

1,203,869.   Specification of Letters Patent.   Patented Nov. 7, 1916.

Application filed January 15, 1916. Serial No. 72,341.

*To all whom it may concern:*

Be it known that I, BARRY E. HALE, a citizen of the United States, residing at Greenfield, in the county of Franklin and State of Massachusetts, have invented new and useful Improvements in Corn and Callous Removers, of which the following is a specification.

This invention has for its object to provide a simple, safe, painless and effective implement for cutting away corns and calli on human feet, and is embodied in an implement comprising a pair of saw blades, the serrated edges of which are parallel and flush with each other and are spaced apart so that when moved lengthwise across a corn each will form an independent kerf, and each will coöperate with the other in preventing lateral displacement or slipping of the implement from the corn to the adjacent cuticle.

Of the accompanying drawings forming a part of this specification: Figure 1 represents a side view of an implement embodying the invention; Fig. 2 represents an edge view of the same; Fig. 3 represents a section on line 3—3 of Fig. 1; Fig. 4 represents a section on line 4—4 of Fig. 1.

The same reference characters indicate the same or similar parts in all the views.

My improved implement comprises two thin saw blades 12, which are perforated at their end portions to receive transverse fastening or connecting members 13 and 14. Between said blades are interposed washers 15 through which the fastening members pass. The thickness of the washers is preferably the same as that of the blades, so that the blades are separated by a narrow space substantially equal to the thickness of a blade, and, causing each blade to form an independent kerf when moved lengthwise in contact with the external surface of a corn, the serrated edges of the blades being parallel and flush with each other.

The thickness of the blades and the width of the space between them are such that the blades are adapted to act simultaneously on a corn and form two independent kerfs therein.

I have found that by moving the blades lengthwise while pressing their serrated edges lightly against the surface of a corn, and by frequently changing the direction of the longitudinal movement, it is an easy matter to remove a corn to its base without danger of cutting the surrounding cuticle and of drawing blood therefrom. The spaced apart blades, forming independent kerfs, coöperate with each other in preventing the implement as a whole from slipping laterally from the corn to the adjacent cuticle.

The implement is grasped between a thumb and forefinger at a point about midway between its ends. To prevent inward flexure of the thin blades by the pressure thus applied, I provide reinforcing strips 16, which are perforated to receive the fastening members 13 and 14, and bear on the outer sides of the blades. Said strips are narrower than the blades, and their lower edges are parallel with and raised above the serrated edges of the blades, so that they act as gages limiting the depth of the kerfs formed by a continued reciprocating movement of the implement in a given direction. It is therefore necessary to frequently change the direction of movement of the implement in such manner as to first form shallow kerfs extending in one direction, and then other shallow kerfs intersecting those first formed, the operation being repeated until the corn is suitably reduced or removed.

The fastening member 13 is preferably a double-headed rivet, inseparably secured, and constituting a permanent hinge permitting the saw blades to be swung or displaced outward independently of each other, as indicated by dotted lines, in position to be filed independently, the fastening member 14 being detachable and composed of a headed screw having a clamping nut 14$^a$. It is therefore unnecessary to arrange the serrations of one blade in transverse alinement with those of the other blade, an arrangement which would be necessary if the blades were not independently displaceable. The permanency of the hinge formed by the member 13 prevents liability of the entire separation of the blades and loss of either blade. The heads of the member 13, and the head and nut of the member 14, constitute means for clamping the strips 16 against the outer sides of the saw blades.

Having described my invention, I claim:—

1. A corn-removing implement, comprising two thin saw blades placed side by side with their serrated edges parallel and flush with each other, spacing washers interposed between said blades, and formed to separate the blades by a space substantially equal to the thickness of a blade, and transverse fastening members connecting said blades and washers, the thickness and spacing of the blades being such that their serrated edges are adapted to act simultaneously on a corn and form independent kerfs therein.

2. A corn-removing implement, comprising two thin saw blades placed side by side with their serrated edges parallel and flush with each other, spacing washers interposed between said blades, and two transverse fastening members connecting said blades and washers, and formed to separate the blades by a space substantially equal to the thickness of a blade, one of said fastening members being inseparably connected with the blades to form a permanent hinge, and the other member being removable to permit the blades to swing independently on the said hinge.

3. A corn-removing implement, comprising two thin saw blades placed side by side with their serrated edges parallel and flush with each other, spacing washers interposed between said blades, and formed to separate the blades by a space substantially equal to the thickness of a blade, reinforcing strips bearing on the outer sides of said blades, and transverse fastening members connecting said blades, washers and strips, and provided with means for clamping the strips against the blades, the lower edges of said strips being located above the serrated edges of the blades, and constituting gages limiting the depth of cut of the serrated edges.

In testimony whereof I have affixed my signature.

BARRY E. HALE.

Copies of this patent may be obtained for five cents each, by addressing the "Commissioner of Patents, Washington, D. C."